(12) United States Patent
Kim

(10) Patent No.: US 7,127,109 B1
(45) Date of Patent: Oct. 24, 2006

(54) DIGITAL INTERFERENCE HOLOGRAPHIC MICROSCOPE AND METHODS

(75) Inventor: Myung K. Kim, Tampa, FL (US)

(73) Assignee: University of South Florida, Tampa, FL (US)

( * ) Notice: Subject to any disclaimer, the term of this patent is extended or adjusted under 35 U.S.C. 154(b) by 632 days.

(21) Appl. No.: 10/089,266

(22) PCT Filed: Sep. 27, 2000

(86) PCT No.: PCT/US00/26462

§ 371 (c)(1),
(2), (4) Date: Nov. 13, 2002

(87) PCT Pub. No.: WO01/23965

PCT Pub. Date: Apr. 5, 2001

Related U.S. Application Data

(60) Provisional application No. 60/156,253, filed on Sep. 27, 1999.

(51) Int. Cl.
*G06K 9/76* (2006.01)
*G01B 11/02* (2006.01)

(52) U.S. Cl. ...................................... 382/210; 356/512
(58) Field of Classification Search ................ 356/457, 356/489, 458, 495, 512, 513, 514
See application file for complete search history.

(56) References Cited

U.S. PATENT DOCUMENTS

| | | | | |
|---|---|---|---|---|
| 5,231,468 A * | 7/1993 | Deason et al. | ............... | 356/513 |
| 5,299,035 A * | 3/1994 | Leith et al. | ..................... | 359/9 |
| 6,246,796 B1 * | 6/2001 | Horikoshi et al. | .......... | 382/232 |
| 6,262,818 B1 * | 7/2001 | Cuche et al. | .................. | 359/9 |
| 6,445,491 B1 * | 9/2002 | Sucha et al. | ................ | 359/330 |
| 6,512,385 B1 * | 1/2003 | Pfaff et al. | ................... | 324/753 |

OTHER PUBLICATIONS

Cuche, E. et al., Digital holography for quantitative phase-contrast imaging, Optics Letters, Mar. 1, 1999, 291-293, vol. 24, Issue 5.
Dakoff, A. et al., Microscopic three-dimensional imaging by digital interference holography, Journal of Electric imaging, Oct. 2003, 1-5, vol. 12, Issue 4.
Karnauhov, V.N. et al., Digital Display Holograms, Optics and Lasers in Engineering, 1998, 361-367, vol. 29.
Kim, M.K., Digital Interference Holography: Development of a New Tomographic Microscopy Instrument, National Science Foundation, Aug. 26, 2002, 1.
Kim, M.K., Microscopic Tomography by Digital Interference Holography, SPIE Proceedings, 8 pages, vol. 5324, No. 18 (not yet published).

(Continued)

*Primary Examiner*—Joseph Mancuso
*Assistant Examiner*—Robert Tarcu
(74) *Attorney, Agent, or Firm*—Michael M. McGaw; Smith & Hopen, P.A.

(57) ABSTRACT

A simple digital holographic apparatus and method allow reconstruction of three-dimensional objects with a very narrow depth of focus or high axial resolution. A number of holograms are optically generated using different wavelengths spaced at regular intervals. They are recorded, such as on a digital camera, and are reconstructed numerically. Multiwavelength interference of the holograms results in contour planes of very small thickness and wide separation. Objects at different distances from the hologram plane are imaged clearly and independently with complete suppression of the out-of-focus images. The technique is uniquely available only in digital holography and has applications in holographic microscopy.

9 Claims, 11 Drawing Sheets

OTHER PUBLICATIONS

Kim, M.K., Tomographic three-dimensional imaging of a biological specimen using wavelength-scanning digital interference holography, Optics Express, Oct. 23, 2000, 305-310, vol. 7, Issue 9.

Kim, M.K., Wavelength-scanning digital interference holography for optical section imaging, Optics Letters, Dec. 1, 1999, 1693-1695, vol. 24, Issue 23.

Kreis, T.M. et al., Methods of Digital Holography: A Comparison, Proc. SPIE, 1997, 224-233, vol. 3096.

Kreis, TM., et al., Digital Holography: Methods and Applications, Proc. SPIE, 1998, 104-115, vol. 3407

Le Clerc, F.et al., Numerical heterodyne holography with two-dimensional photodetector arrays, Optics Letters, 716-718, vol. 25, Issue 10.

Piestun, R. et al., On-axis computer-generated holograms for three-dimensional display, Optics Letters, 922-924, vol. 22, No. 12.

Poon, T.C., et al., Three-dimensional microscopy by optical scanning holography, Optical Engineering, May 1995, 1338-1344, vol. 34, No. 5.

Schilling, B.W. et al., Three-dimensional holographic fluorescence microscopy, Optics Letters, Oct. 1, 1997, vol. 22, No. 19.

Schnars, U. et al., Digital holography-a new method of laser metrology, Laser und Optoelektonik, 1994, 40-45, vol. 26.

Seebacher, S.,et al., Measuring Shape and Deformation of Small Objects using Digital, Proc. SPIE, Jul. 1998, 104-115, vol. 3479.

Trester, S., Computer simulated holography and computer generated holograms, Am. J. Phys., Apr. 1996, 472-478, vol. 64, No. 4.

Yang, H.et al., 3D digital hologram synthesis based on angular spectrum, Proc. SPIE, Apr. 1998, 169-178, vol. 3389.

Yang, Hoon-Gee et al., Hologram segmentation for Relaxing Sampling Constraint in Digital Hologram, J. Korea Inst. Electronics Engineers, 1998, 76-81, vol. 35D.

Yaroslavksy, Leonid et al., Fundamentals of Digital Optics-Digital Signal Processing in Optics and Halography, Birkhauser, 1996.

Zhang, Tong et al., Three-dimensional microscopy with phase-shifting digital holography, Optics Letters, Aug. 1, 1998, 1221-1223, vol. 23, No. 15.

Zhang, Tong et al., 3-D microscopy with phase-shifting digital holography, SPIE, Jul. 1998, 152-159, vol. 3479.

Brown, Gordon C. et al., Holographic microscope for measuring displacements of vibrating microbeams using time-averaged, electro-optic holography, Opt. Eng., May 1998, 1398-1405, vol. 37, No. 5.

Huang, David et al., Optical Coherence Tomography, Science, New Series, Nov. 22, 1991, 1178-1181. vol. 254, No. 5035.

Isenberg, G., Modern Optics, Electronics, and High Precision Techniques in Cell Biology, Springer, 1998.

Robb, Richard A., Three-Dimensional Biomedical Imaging, John Wiley & Sons, 1997.

Schnars, Ulf et al., Digital recording and numerical reconstruction of holograms: reduction of the spatial frequency spectrum, Opt. Eng., Apr. 1996, 977-982, vol. 35, No. 4.

Sheppard, C.J.R. et al., Confocal Laser Scanning Microscopy, Springer 1997.

Yaroslavskii, L.P. et al., Methods of Digital Holography, Consultants Bureau, 1980.

\* cited by examiner

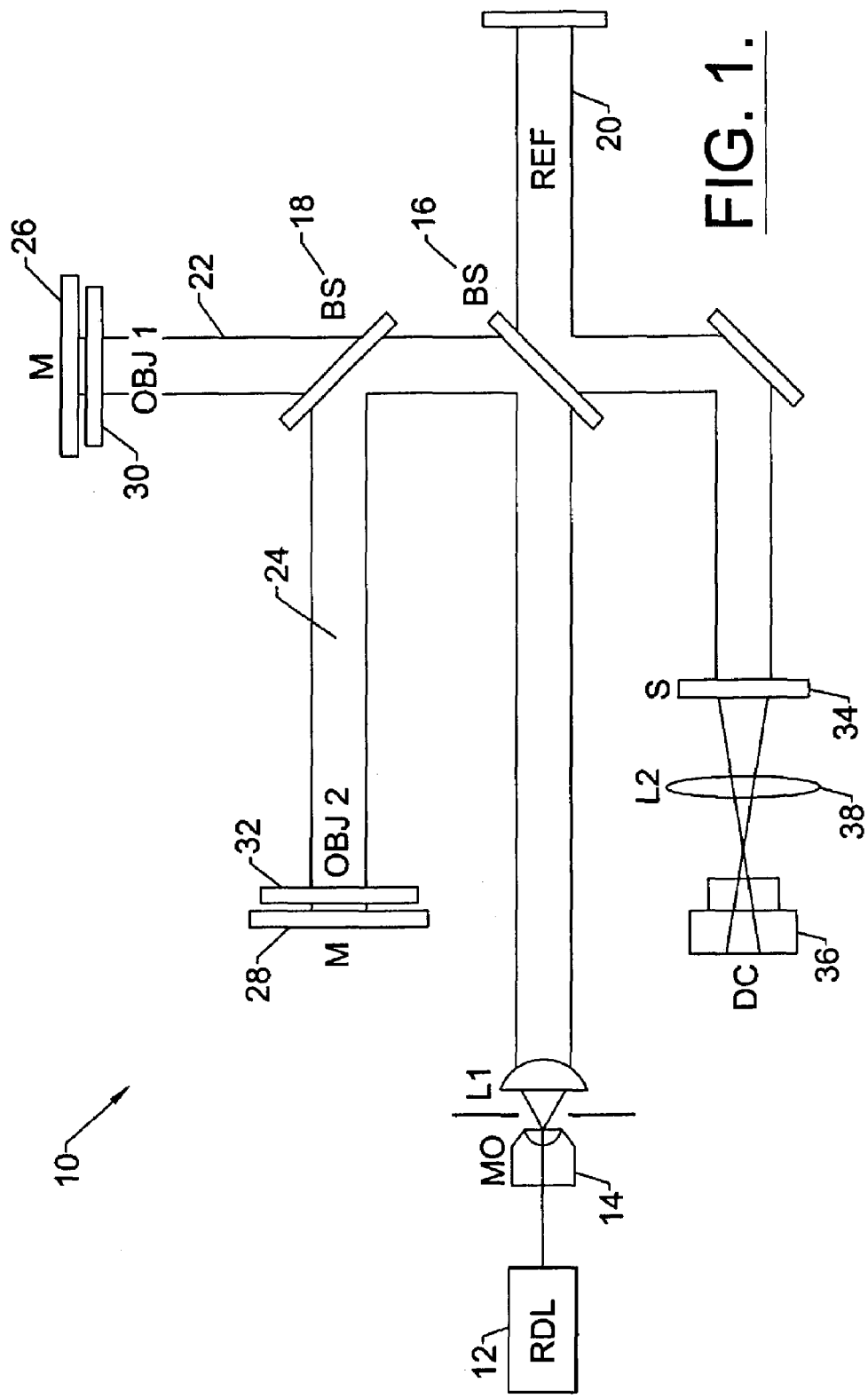

DIGITAL INTERFERENCE HOLOGRAPHIC MICROSCOPE AND METHODS

CROSS-REFERENCE TO RELATED APPLICATION

This application claims priority to provisional application 60/156,253, filed Sep. 27, 1999.

BACKGROUND OF THE INVENTION

1. Field of the Invention

The present invention relates to microscopic imaging, and, more particularly, to holographic microscopy for reconstruction of three-dimensional objects and optical tomographic imaging for selectively imaging cross sections of an object.

2. Description of Related Art

Imaging of microscopic objects is an essential art, not only in biology and medicine, but also in many other fields of science and technology, including materials science, microelectronics engineering, and geology. Modern microscopy takes advantage of discoveries on the interaction between electromagnetic and other fields with material objects, and has taken on numerous incarnations, such as electron transmission and scanning microscopes, the scanning tunneling microscope, the atomic force microscope, and the laser scanning confocal microscope (Isenberg, 1998).

Rapid progress in electronic detection and control, digital imaging, image processing, and numerical computation has been crucial in advancing modern microscopy. By equipping an optical microscope with a digital or video camera, a range of image processing and pattern recognition techniques can be applied for automated image acquisition and analysis (Herman and Lemasters, 1993).

One particular aspect of microscopic imaging of interest is the axial resolution or depth of focus. In a conventional optical microscope, the lateral resolution can be a fraction of a micrometer, whereas the axial resolution is typically several micrometers or more. This leads to two related difficulties: One is that the axial position cannot be determined with better than a few-micrometer accuracy; another is that the overlap of images from object planes several micrometers apart leads to blurring and degradation of images. Usually the only remedy available is physical sectioning of the specimen into thin slices, which precludes a large range of materials from being studied.

A remarkable solution to these problems was the scanning confocal microscope, developed just over a decade ago (Sheppard and Shotton, 1997). by illumination of a single object point and placement of a detection aperture at the image point, the detector behind the aperture registers a light signal originating only from the object point. A two- or three-dimensional image is constructed by pixel-by-pixel scanning of the object volume. The whole of the resulting image is sharply in focus, and the size of the acquirable image is limited only by the stability and speed of the scanning and processing system.

Another important optical scanning system is the near-field optical scanning microscope, where the light signal is probed by a highly tapered optical fiber at a distance only a fraction of an optical wavelength from the sample surface, thereby circumventing the diffraction limit of resolution in far-field imaging. However, the application of this technique in imaging wet and delicate biological samples has been limited because of the requirement to maintain a constant surface-probe distance with accuracy and stability. It is more suitable for the study of macromolecular structures, as with other related scanning devices that utilize electron tunneling, atomic force, and other subtle interactions on the atomic and molecular level.

Holography was originally invented in an attempt to improve the resolution of a microscope (Hariharan, 1996). Both the amplitude and phase information of the light wave are recorded in a hologram by the interference of an object wave that is to be imaged with a reference wave of simple structure such as a plane or spherical wave. The interference pattern is recorded in a variety of media, most commonly on a photographic plate. The object wave is reconstructed as one of the diffraction patterns when a replica of the reference wave is incident on the photographic plate. The resulting image is an exact copy of the light wave that originally emanated from the object, and thus has the property of perspective vision.

Because the holographic image retains the phase as well as the amplitude information, a variety of interference experiments can be performed, and this is the basis of many interferometric applications in metrology. It is possible accurately to measure deformation and other variations of an object at a submicrometer level because of advances in digital imaging and numerical computing technology. Thus it is often advantageous to replace steps of the holographic procedure with digital processes (Yaraslavskii and Merzlyakov, 1980).

In computer-generated holograms (CGH) the interference pattern is computed from a mathematical definition of a virtual object and reference (Trester, 1996). The patter is output to a hard-copy device, and laser illumination results in an optical hologram image.

On the other hand, in computer-reconstructed holograms (CRH), the optical interference pattern of a real object and reference is recorded using an electronic or digital camera (Schnars and Jüptner, 1996). The pattern is digitized and stored in a computer, and the holographic image is recreated on the computer by numerical calculation.

In either CGH or CRH, the numerical calculation basically imitates the optical diffraction process as the light wave propagates from the object to the hologram plane or from the hologram plane to the image plane. This can be accomplished using Fresnel diffraction theory or Huygens wavelet theory (Kreis et al, 1997). An important aspect of research in this area is in attempts to minimize the computational load using, for example, segmentation of holograms and horizontal-only parallax (Karnaukhov et al., 1998; Yang et al., 1998a,b).

Digital holography alleviates the need for wet chemical processing of a photographic plate, although at some expense of resolution. However, once the amplitude and phase (i.e., all the essential information) of the light wave are recorded numerically, one can easily subject these data to a variety of manipulations, and so digital holography offers capabilities not available in conventional holography. For example, the phase information of the light wave is available directly from the numerical reconstruction and greatly simplifies interferometric deformation analysis (Seebacher et al., 1998; Kreis et al, 1998; Cuche et al, 1999; Brown and Pryputniewicz, 1998).

Holography can be applied to microscopy in two alternative ways. In one, a hologram of a microscopic object is taken directly, and the hologram is inspected using a microscope; in the other, a microscope is used first to magnify the object image, and the hologram is taken of that image. Holographic microscopy has been particularly useful in particle analysis, where a particle count has to be obtained in a volume of fluid (Vikram, 1992). With a conventional microscope, the constant motion of particles into and out of the focal plane makes it difficult to ascertain an accurate count as the focal plane is scanned across the entire sample volume. A holographic micrograph freezes the three-dimensional field, and a particle count can proceed by focusing on successive planes.

Holographic microscopy in three-dimensional imaging applications has been limited partly because of the inherent scale distortion of an optical microscope image of a volume object. The axial magnification goes as the square of the lateral magnification, so that the two directions magnify with different ratios, and the lateral magnification also depends on the axial distance. When the hologram is viewed by focusing on a plane, the same problem of out-of-focus image blurring is present as in an optical microscope (Zhang and Yamaguchi, 1998; Poon et al., 1995).

Application of digital holography in microscopy holds potentially attractive benefits (Schilling et al., 1997). In principle, once the amplitude and phase information of the object image is numerically stored, it can be manipulated by image processing techniques for removal of distortion and out-of-focus blurring. Interference measurements can yield subwavelength resolution of features, and particle analysis and feature recognition can be automated with greater efficiency.

Another imaging technique, tomography, has been utilized in biomedical and materials sciences (Robb, 1997), with optical tomography most useful in microscopic imaging because of the short wavelength and limited penetration depth of most biological surfaces. For example, laser confocal microscopy (Sheppard and Shotton, 1997) uses aperturing of both the illuminated sample volume and the detector aperture, thereby rejecting all scattered light other than from the focal volume. Optical coherence tomography (Huang et al., 1991; Morgner et al., 2000) is a time-of-flight measurement technique, using ultrashort laser pulses or a continuous-wave laser of very short coherence time. In both of these methods the signal is detected one pixel at a time, and the three-dimensional image is reconstructed by scanning the three-dimensions pixel by pixel. Although microscanning using piezo actuators is an important technique, being able to obtain image frames at a time would have technical advantages.

By recording the phase as well as the intensity of light waves, holography allows reconstruction of the image of 3D objects, and gives rise to many metrological and optical processing techniques (Hariharan, 1996). It is now possible to replace portions of the holographic procedure with electronic processes (Yaroslavsky and Eden, 1996). For example, in digital holography the hologram is imaged on a CCD array, replacing photographic plates of conventional holography. The digitally converted hologram is stored in a computer, and its diffraction is numerically calculated to generate simulation of optical images.

With digital holography, real-time processing of the image is possible, and the phase information of the reconstructed field is readily available in numerical form, greatly simplifying metrological applications (Cuche et al., 1998). Previously limiting memory and speed factors have improved (Trester, 1996; Piestun et al., 1997). On the other hand, for the purpose of tomographic imaging, although the hologram produces a 3D image of the optical field, this does not by itself yield the tomographic distance information to the object surface points, other than by focusing and defocusing of the object points, which is really a subjective decision (Poon et al., 1995; Zhang and Yamaguchi, 1998a). The distance information can be obtained in time-of-flight-type measurements, or it can be determined by counting the number of wavelengths or some multiples of it, which is the basis of various interference techniques.

One technique is the interference of two holograms recorded at two different wavelengths, resulting in a contour interferogram with the axial distance between the contour planes inversely proportional to the differences in wavelengths. In digital holography, it is possible to extend the process to recording and reconstruction of many holograms without introducing any wavelength mismatch or crosstalk. If a number of regularly spaced wavelengths are used for recording and reconstruction, then the peaks of the cosine-squared intensity variation of two-wavelength interference become sharper and narrower, as when a number of cosines with regularly spaced frequencies are added.

SUMMARY OF THE INVENTION

It is an object of the present invention to provide a simple digital holographic method and apparatus for reconstructing three-dimensional objects with a very narrow depth of focus or axial resolution.

It is another object to provide such a method and apparatus that affords submicrometer resolution in both the lateral and the longitudinal directions.

It is a further object to provide such a method and apparatus wherein the blurring and degrading of images due to out-of-focus object planes are substantially completely suppressed.

It is an additional object to provide such a method and apparatus that carries out an interference process in numerical virtual space.

Another object is to provide such a method and apparatus wherein the obtained optical sectioned images can be reassembled into a three-dimensional digital model that can be further manipulated for specific applications, such as correction of scale distortion, arbitrary section and cutaway views, and automatic feature enhancement and identification.

A further object is to provide a method and apparatus for imaging a three-dimensional object having a diffuse surface.

An additional object is to provide such a method and apparatus for generating a three-dimensional numerical model of the imaged surface structure.

These and other objects are achieved by the present invention, a first embodiment of which comprises an apparatus and method for imaging three-dimensional microscopic volume objects with digital holographic microscopy.

As is known in the art, interference of two holograms recorded at two different wavelengths results in a contour interferogram, with the axial distance between the contour planes inversely proportional to the difference in wavelengths. In CRH, unlike in conventional holography, the reconstruction of each hologram is done using the corresponding wavelength that was actually used in the recording process. Therefore, it is possible to extend the process to recording and reconstruction of many holograms without introducing any wavelength mismatch. If a number of regularly spaced wavelengths are used for recording and reconstruction, then the peaks of cosine-squared intensity variation of two-wavelength interference becomes sharper and narrower, as when a number of cosines with regularly spaced frequencies are added.

The present invention addresses a practical problem in microscopy, where the axial magnification goes as the square of the transverse magnification. Even at moderate magnification, it is difficult to bring the entire microscopic object into focus, while the out-of-focus portions of the object image contribute to blurring and noise of the focal plane image. Confocal scanning microscopy (CSM) addresses this problem very successfully (Sheppard and Shotton, 1997), although the requirement of stability and precision of lengthy mechanical scanning can be quite significant.

A hologram has depth perception and axial resolution, but determination of axial location in particle analysis, for example, depends only on the focusing of the image as the depth is varied (Zhang and Yamaguchi, 1998b), and out-of-focus blurring presents the same problem as in microscopy.

The present invention involves no mechanical motion, and wavelength scanning and multiple exposure can be electronically automated for speed and stability. Furthermore, many of the holographic interferometric and optical processing techniques can be applied to the resulting images for various applications.

The principle of wavefront reconstruction by holography is well known. The electric field $E_0$ arriving from an object interferes with a planar, or other simply structured, write reference wave $E_r$, resulting in an intensity pattern of:

$$I \sim |E_r + E_0|^2 = |E_r|^2 + |E_0|^2 + E_r^* E_0 + E_r E_0^*$$

which is recorded in some manner. In CRH one may subtract the zero-order terms $|E_r|^2$ and $|E_0|^2$, and the remaining terms give rise to the holographic twin images. For simplicity, one neglects the effect of the conjugate image and considers the third term in the above equation only, and also lets the reference wave be planar and incident perpendicular to the hologram plane, so that $E_r \sim 1$. In reconstruction, if one also uses $E_r$ as the read reference wave, then the diffracted wave is proportional to $E_0$, a replica of the original object wave (or its conjugate $E_0^*$).

Now consider an object point P located at $(x_0, y_0, z_0)$, which emits a Huygens spherical wavelet proportional to $A(P)\exp(ikr_P)$ measured at an arbitrary point $Q=(x, y, z)$, where $r_p = |r_P - r_Q|$ is the distance between P and Q, and the $1/r$ dependence of the amplitude is neglected. The wave propagates in the general z direction. The factor $A(P)$ represents the field amplitude and phase at the object point. For an extended object, the field at Q is proportional to the above wavelet field integrated over all the points on the object:

$$E_k(Q) \sim \int_P d^3 r_P A(P) \exp(ikr_P)$$

This is the field that is present in the vicinity of the object under monochromatic illumination, and this is also the field reconstructed by holography. The factor $\exp(ikr_P)$ represents the propagation and diffraction of the object wave. Now suppose a number of copies of the electric field are generated by varying the wave numbers k (or wavelengths λ), all other conditions of object and illumination remaining the same. Then the resultant field at Q is:

$$E(Q) \sim \sum_k \int_P d^3 r_P A(P) \exp(ikr_P) =$$
$$\int_P d^3 r_P A(P) \sum_k \exp(ikr_P) \sim \int_P d^3 r_P A(P) \delta(r_P - r_Q) \sim A(Q)$$

That is, for a large enough number of wave numbers k, the resultant field is proportional to the field at the object, and nonzero only at object points. In practice, if one uses a finite number N of wavelengths at regular intervals of $\Delta\lambda$ (with corresponding intervals of frequencies $\Delta f$), then the object image $A(P)$ repeats itself at axial distances $\Lambda = \lambda^2/\Delta\lambda = c/\Delta f$ with an axial resolution of $\delta = \Lambda/N$. By using appropriate values of $\Delta\lambda$ and N, the contour plane distance $\Lambda$ can be matched to the axial extent of the object and $\delta$ to the desired level of axial resolution. Note that for a given level of axial resolution $\delta$, the required range of wavelengths $N \Delta\lambda$ is the same as the spectral width of low-coherence or short-pulse lasers in optical coherence tomography.

Optical sectioning microscopy by wavelength-scanning digital interference holography (WS-DIH) proceeds as follows. A microscopic object is illuminated by a laser, and a microscope lens forms a real magnified image of the object. Light from this intermediate image and a reference beam interferes at a CCD array surface, which is recorded digitally into a computer. The laser wavelength is stepped by $\Delta\lambda$ for the next exposure, and the process is repeated N times, which completes the recording process. The axial scale of the object determines the necessary wavelength step $\Delta\lambda$. Using the example of a 10-μm-radius sphere and 50×lateral magnification, the longitudinal extent of the intermediate image is 20 μm×$50^2$=50 mm, which sets the minimum for the contour plane distance $\Lambda$. Using 600-nm light, the required frequency step is $\Delta f = c \Delta\lambda/\lambda^2 = 6$ GHz. To obtain effective axial resolution of, say, 1 μm=20 μm/20, one needs to take 20 hologram images while scanning the laser frequency up to 120 GHz=4 $cm^{-1}$. These parameters are easily within range of many laser systems, including dye lasers and semiconductor lasers. Note that the frequency step $\Delta f$ is inversely proportional to the object axial scale $\Lambda$.

The set of N digitally stored holograms represents the complete information required for computational reconstruction of the three-dimensional image. For each hologram, after subtraction of zero-order intensities, a diffraction theoretical formula is applied to compute the light wave field of the image. Repeat the computation of N holographic images, and they are added together for digital interference. The resultant image is an intensity distribution pattern that corresponds to three-dimensional map of scattering centers of the object, such as the boundary surfaces, internal structures, and other points of irregularities in absorption or dispersion of light.

The result can be displayed as two-dimensional cross sections of the object at an arbitrary distance from the hologram plane. With the set of numerical representation of the images, further manipulation and processing is possible. For example, the microscopic image distortion, including the unequal lateral-axial magnifications and the axial dependence of the lateral magnification, can be processed out by applying corrective scale factors. The corrected cross sections can then be reassembled into a three-dimensional computer model with natural aspect ratios. The three-dimensional computer model is then available for application-specific manipulations such as viewpoint changing, cutaway views, feature enhancement, and others.

The system of the present invention takes advantage of the unique power of digital holography to provide a simple and versatile mode of three-dimensional microscope imaging. One may put this concept in perspective in terms of its potential advantages over other imaging modes and of possible difficulties that may arise.

The lateral resolution should be as good as conventional optical microscopy, except that the present system is a coherent imaging system, and so one needs to exercise care with speckle noise and other interference effects.

On the other hand, the multiple exposure of the scheme of the present invention tends to have a signal-averaging effect. Studies seem to indicate such an enhancement of image quality.

The axial or longitudinal resolution is excellent in comparison with conventional optical microscopy. Scanning confocal microscopy was developed to address the problem of axial resolution in conventional optical microscopy. The axial resolution of a confocal system is determined mainly by the focal depth of the illuminated spot, to ~0.5 μm. With WS-DIH, a comparable axial resolution may be expected or even exceeded. Digital holography has been used to demonstrate ~λ/10 or ~50 nm vertical resolution in the inspection of a microelectronics circuit.

The wavelength scanning system of the present invention has no mechanical moving components. In principle, the amount of voxel (volume element) data generated by WS-DIH is the same as in SCM: $M_x \times M_y \times N$, where the Ms are the number of pixels in the x and y directions and N is the number of z sections. In SCM, the system has to raster scan each plane pixel by pixel and then repeat the process for N planes. The requirement of mechanical accuracy and stability can be substantial and entails an elaborate feedback control system. On the other hand, the present system acquires a single whole plane of data in one shot, and in most laser systems tuning and scanning of the gigahertz range is electronically controllable, providing efficiency, stability, and accuracy. With present CCD technology, however, the bottleneck may occur at the image transfer rate between the CCD array and the computer memory.

The system of the present invention is a holographic system, and as such, the complete amplitude and phase information of the light field is available. One can take advantage of this information that is not available in other imaging systems, for applications in interferometry and holographic image processing.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 1 is a schematic of an apparatus for multiwavelength digital holography.

FIG. 2A, reference beam; FIG. 2B, object beam at the screen; FIG. 2C, interference between the reference and the object; FIG. 2D, intensity patterns of FIGS. 2A and 2B subtracted from FIG. 2C; FIG. 2E, numerically reconstructed image at $z_i = z_0 = 149$ cm.

FIG. 3A, interference pattern between reference and object, minus zero-order terms; numerically reconstructed images: FIG. 3B, at $z_i = z_{o1} = 149$ cm; and FIG. 3C, at $z_i = z_{o2} = 165$ cm.

FIG. 4A, a single wavelength or frequency; FIG. 4B, combination of two holograms at relative frequencies, 0.0 and 1.0 GHz; FIG. 4C, two relative frequencies, 0.0 and 2.0 GHz; FIG. 4D, three relative frequencies, 0.0, 1.0, and 2.0 GHz.

FIG. 5A, at $z_i = z_{o1} = 149$ cm; FIG. 5B, at $z_i = z_{o2} = 165$ cm.

FIG. 8A, a hologram; FIG. 8B, an object, OO*; FIG. 8C, a reference, RR*.

DETAILED DESCRIPTION OF THE PREFERRED EMBODIMENTS

Figure 2A:
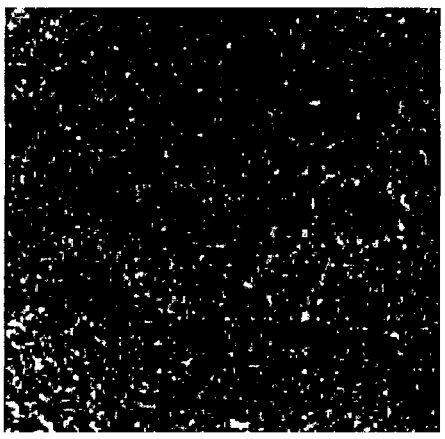
FIGS. 2A–2E are reconstructions of an image of a single object (OBJ1) using a single wavelength.
Figure 2B:
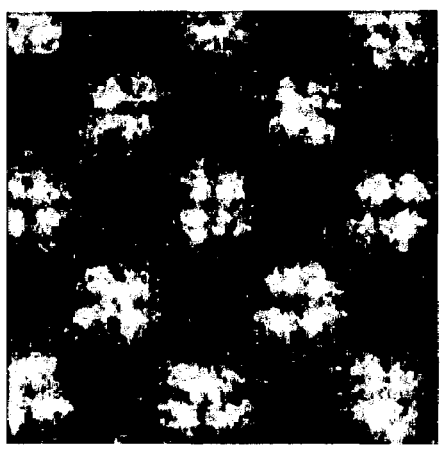
Figure 2C:
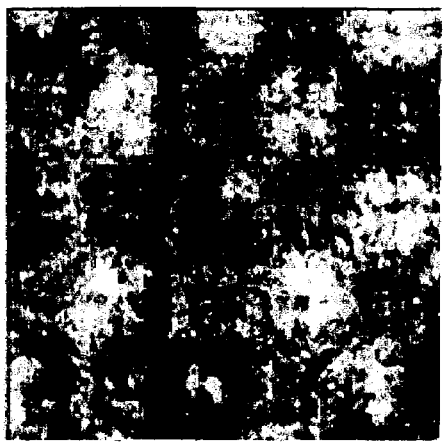

A description of the preferred embodiments of the present invention will now be presented with reference to FIGS. 1–11.

The apparatus 10 of the present invention is depicted in FIG. 1. A ring dye laser 12 provides a 595.0-nm laser field of ~50-mW power with a linewidth of ~50 MHz. The laser beam is expanded with a microscope objective 14 to 20 mm diameter and divided into three parts using beam splitters 16,18. One of these provides the planar reference beam 20, while the other two 22,24 constitute the object beam. The object consists of two transparency targets attached to the back-reflecting mirrors (M) 26,28 in separate optical arms, in order to avoid obstruction of one object by the other in the same optical path. One target 30 (OBJ1) is a checkerboard pattern with 2.5-mm grid size, and the other target 32 (OBJ2) is a transparent letter "A" that fits inside an opaque square of side 13 mm.

The object 22,24 and reference 20 beams are combined in a Michaelson interferometer arrangement and sent to a translucent Mylar screen S 34. The object distances to the screen are approximately 149 and 167 cm. The interference pattern on the screen is imaged, for example, by digital camera 36, such as a Kodak DC120, through another lens L2 38 for adjustment of focus and magnification. The exemplary camera 36 has 960×1280 pixels with 10×10 μm² pixel size. The calculations presented here use 256×256 pixel images of screen area 13×13 mm, so that the effective pixel resolution on the screen is 51 μm, although this is not intended to be limiting. The corresponding minimum distance for the object is then 1.1 m, in order to accommodate the interference between rays emanating from the two ends of a 13-mm object. For each hologram, the reference beam and the object beam are imaged separately, so that these images can be subtracted before reconstruction and the resulting images do not contain zero-order terms. It is not attempted to eliminate the conjugate image. The process is repeated a plurality of times, here up to 11 laser frequencies spaced 1.0 GHz apart, to achieve a desired axial period $\Lambda$ of the resultant hologram images, here 30 cm, and a desired axial resolution $\delta$, here 3.0 cm.

For reconstruction of images, a software package, for example, a MatLab program, encodes the Fresnel diffraction, which is equivalent to Eq. (2) with appropriate approximations (Goodman, 1968):

$$E(x,y;z) = \exp[(ik/2z)(x^2+y^2)] F\{E_0(x_0,y_0)S(x_0,y_0;z)\}[k_x,k_y]$$

where $$S(x,y;z) = -(ik/z)\exp[ikz+(ik/2z)(x^2+y^2)]$$

$k_x = kx/z$, $k_y = ky/z$, and $F\{f\}[k]$ represents a Fourier transform f with respect to the variable k.

Figure 2D:
Figure 2E:
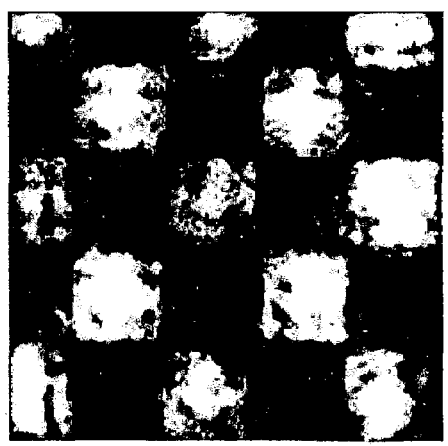

FIGS. 2A–2D illustrate the input images of the reference (R, FIG. 2A), the object (O, using OBJ1, FIG. 2B), the interference hologram between the two (H, FIG. 2C), and the subtracted image E=H−R−O (FIG. 2D). The holographic image in FIG. 2E of the single object is reconstructed at $z_i$=149 cm, and shows typical resolution and quality of the reconstructed images ($z_o$ and $z_i$ are object and image distances, respectively, measured from the screen). The remaining fringe pattern inside the squares is due to the out-of-focus twin image.

Figure 3A:
FIGS. 3A–C are reconstructions of images of two objects (OBJ1 and OBJ2) using a single wavelength.
Figure 3B:
Figure 3C:
Figure 4A:
FIGS. 4A–4D are reconstructed image patterns as functions of image distance. The horizontal axis is $z_i$ in cm, and the vertical axis, in mm, is a slice of the reconstructed image along the dotted line shown in FIG. 3C.

FIG. 3A shows the hologram with both objects OBJ1 and OBJ2 on, after subtraction of reference and object images. The images are reconstructed near the two object distances (FIG. 3B) $z_{i1}$=149 cm and (FIG. 3C) $z_{i2}$=165 cm. The two images are substantially indistinguishable and contain images of both objects, although it is possible to discern differences in the sharpness of focus between the two images. The axial resolution determined by focal sharpness is at least ~15 cm, as can be seen in FIG. 4A, where the vertical axis is a slice of the reconstructed image along the dotted vertical line of FIG. 3C and the horizontal axis is the image distance $z_i$ from 140 to 190 cm.

Figure 4B:
Figure 4C:
Figure 4D:
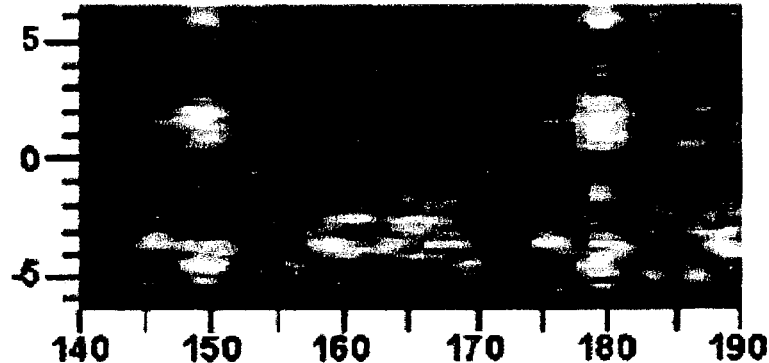

In FIG. 4B two holograms with frequency separation of 1.0 GHz are combined, showing the expected cosine-squared modulation with a period of 30 cm, whereas in FIG. 4C, two frequencies 2.0 GHz apart are combined and the period is now 15 cm. In FIG. 4D, three relative frequencies of 0.0, 1.0, and 2.0 GHz are combined, and the narrowing of interference maxima is evident (cf. FIGS. 4B and 4D). Also note that the images of OBJ1 and OBJ2 focus at different $z_i$ locations: The three bright areas near $z_i$=150 cm (and also at 180 cm) are the three bright squares of OBJ1's checkerboard, while the bright patch near y=−3.0 mm, $z_i$=165 cm corresponds to the lower left corner of OBJ2's letter "A." Carrying this process further, eleven holograms with frequencies 0.0, 1.0, 2.0, . . . , 10.0 GHz are combined in FIG. 4E, which results in an axial resolution of ~3 cm, as expected.

Figure 5A:
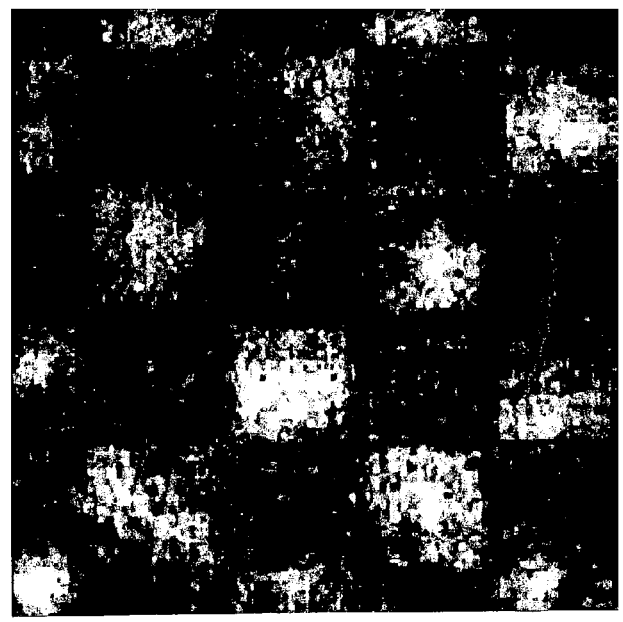
FIGS. 5A and 5B are reconstructed images with two objects using eleven holograms.
Figure 5B:
Figure 6:
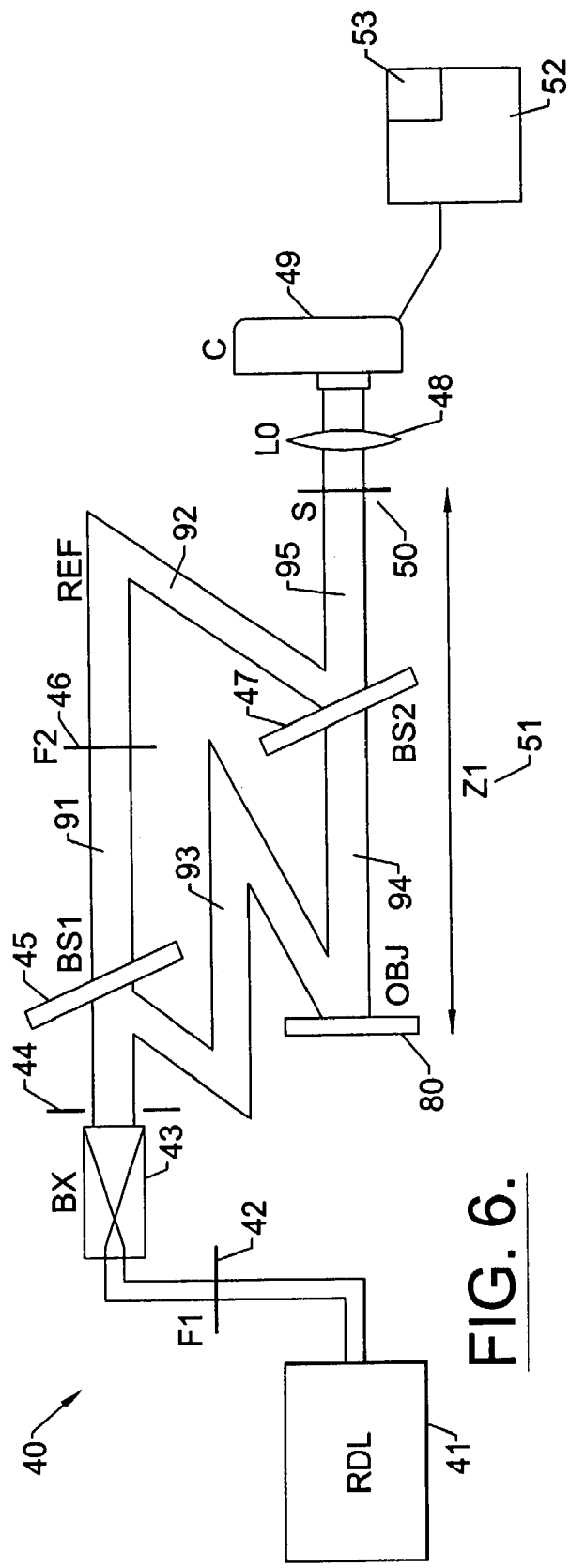
FIG. 6 is a schematic of an apparatus for digital interference holography.

The images at two distances are shown in FIG. 5A for $z_{i1}$=149 cm and $z_{i2}$=165 cm. Now each of the images contains only one of OBJ1 or OBJ2, and the out-of-focus images are substantially suppressed.

The invention thus demonstrates the use of multiwavelength interference of computer-reconstructed holograms for high axial resolution of three-dimensional images. The apparatus is very simple and amenable to electronic automation without mechanical moving parts. Even with less-than-optimal laser and imaging systems, the theoretically predicted axial resolution is easily achieved. The main source of imperfection in FIGS. 4A–4D, for example, was the mode hop and drift of the nonstabilized laser frequency. Another embodiment may include, for example, the use of a compact diode laser, direct transfer of an image to a CCD array surface, and automation of the multiple exposure for speed and stability. The technique can be applied to both microscopic and telescopic imaging for cross-sectional imaging of objects of various scales. The cross-sectional images can then be recombined with appropriate scaling for the removal of distortion, resulting in a synthesis of three-dimensional models that can be subjected to further analysis and manipulation.

In a second embodiment of the present invention, a holographic apparatus 40 (FIG. 6) comprises a laser, for example, a ring dye laser 41. A portion, here 50 mW, of the laser's output is passed through a first neutral density filter 42 and is expanded to a predetermined diameter, here 10 mm, with a beam expander and spatial filter 43.

The beam 90 is apertured 44 to a desired diameter, here 5 mm, and directed to a first beam splitter 45. A first portion 91 of the split beam passes through a second neutral density filter 46 and becomes the reference beam 92. A second portion 93 of the split beam is directed to the object 80, here a damselfly specimen, shown under laser illumination in FIG. 6A, wherein the eyes, mouthpiece, and front several legs are visible.

The scattered light 94 from the object 80 is combined with the reference beam 92 at a second beam splitter 47 to form an interference beam 95, which then passes through a magnifying lens 48 to image the optical image at the camera's 49 focal plane 50 onto infinity. The camera 49, for example, a digital camera (such as model DC290, manufactured by Kodak, Rochester, N.Y.), is focused at infinity, so that it records a magnified image of the optical intensity at the plane S 50. The object-to-hologram distance 51 here is 195 mm. The object beam 94 preferably should be apertured so that it only illuminates the area of the object 80 that is to be imaged; otherwise, spurious scattering can seriously degrade the contrast and resolution of the reconstructed image.

Figure 8A:
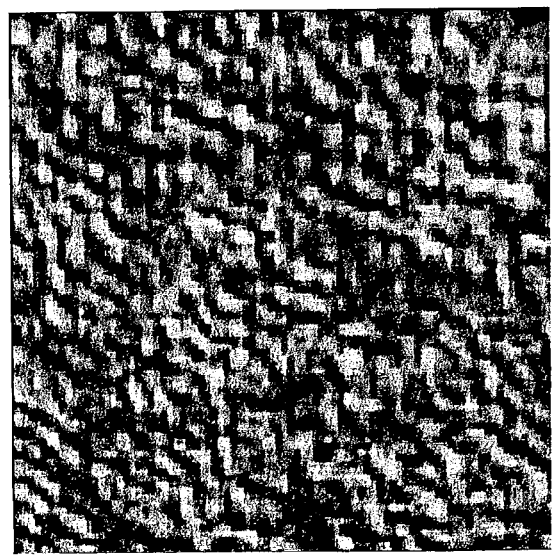
FIGS. 8A–8C are digitally recorded optical fields.
Figure 8B:
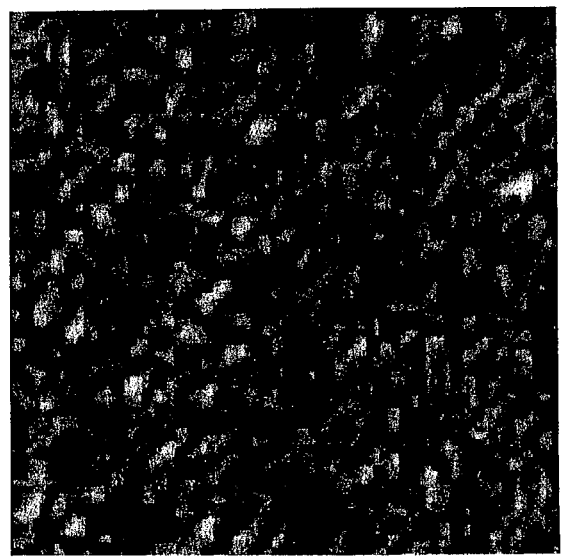
Figure 8C:
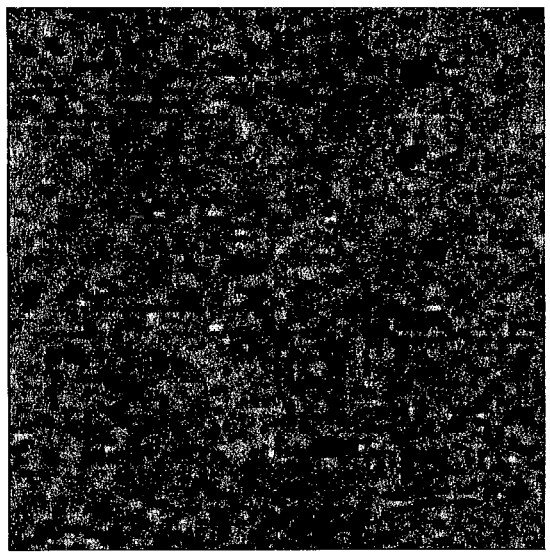

At a given laser wavelength, three images are recorded: a hologram of the object and reference interference (HH*=|O+R|², FIG. 8A), the object only (OO*, FIG. 8B), and the reference only (RR*, FIG. 8C). The laser wavelength is then stepped, starting from $\lambda_0$=601.7 nm at $\Delta\lambda$=0.154-nm intervals for N=10 steps, so that the expected axial range is $\Lambda$=2.35 mm and the axial resolution is $\delta$=0.12 mm.

The digitally recorded images are transferred to a computer 52, where software means 53, for example, a set of MatLab® scripts, are used for numerical reconstruction. A desired area, here 4.8×4.8 mm, of the image is interpolated to a 512×512 pixel matrix. In an alternate embodiment, a CCD array is used instead of the camera 49, wherein the image magnification and interpolation steps are not performed.

The object and reference frames are then numerically subtracted from the hologram frame, HH*−OO*−RR*, before applying Fresnel diffraction, to eliminate zero-order diffraction. A clean holographic image is then obtained even at 0° offset between the object and reference beams. It is believed that this leaves conjugate images RO* and R*O, but one of these is substantially completely out of focus and does not appear to interfere with the process of the present invention. The holographic image field is then calculated as above.

The numerical reconstruction and digital interference proceeds by starting from a 512×512 pixel, 4.8×4.8 mm digital hologram (with zero-order subtraction). The Fresnel diffraction patterns are calculated at N+1=21 z values, $z=Z_1+m\delta$, where $Z_1=195$ mm is the original object distance 51 and m=−10, −9, . . . , 9, 10. This results in a 3D array of 512×512×21 pixels and a 4.8×4.8×2.35 mm volume, representing the holographic optical field variation in this volume.

This process is repeated for 20 sets of triple digitally recorded images at 20 different wavelengths. At this point, the field patterns in the individual 3D arrays show little variation along a few millimeters of the z direction. Then the 20 3D arrays are numerically superposed by adding the arrays element wise, resulting in the accumulated field array of the same size. This new array then has a field distribution that represents the 3D object structure, as described previously. In practice, owing to the laser's frequency fluctuation and imprecision of the wavelength intervals, there is a random phase variation among the 20 calculated field arrays. This may be corrected by introducing a global phase factor into each of the 3D arrays before carrying out the summation.

Figure 7A:
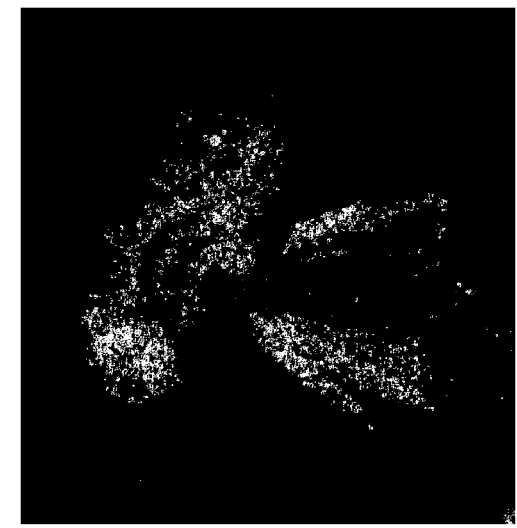
FIG. 7A is a direct camera image of a damselfly under laser illumination.
Figure 7B:
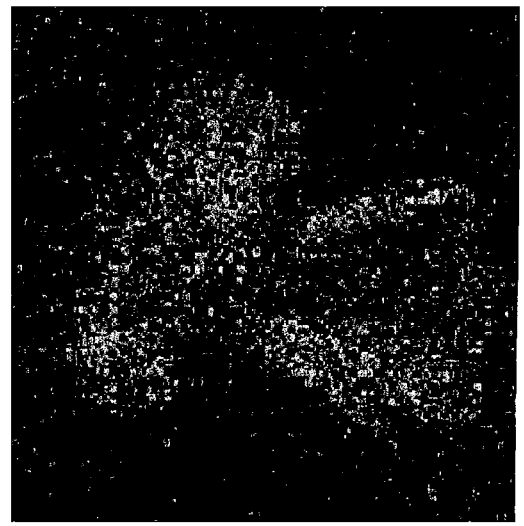
FIG. 7B is a numerically reconstructed image from one hologram.

FIG. 7B is an example of a 2D holographic image reconstructed from a single hologram at $Z_1=195$ mm. Imaging of diffuse scattering objects, such as the biological specimen of this exemplary illustration, using coherent illumination gives rise to speckle noise, causing degradation of contrast and resolution. This can be reduced somewhat by optimizing the illumination aperture and the overall stability of the optical system.

Figure 9:
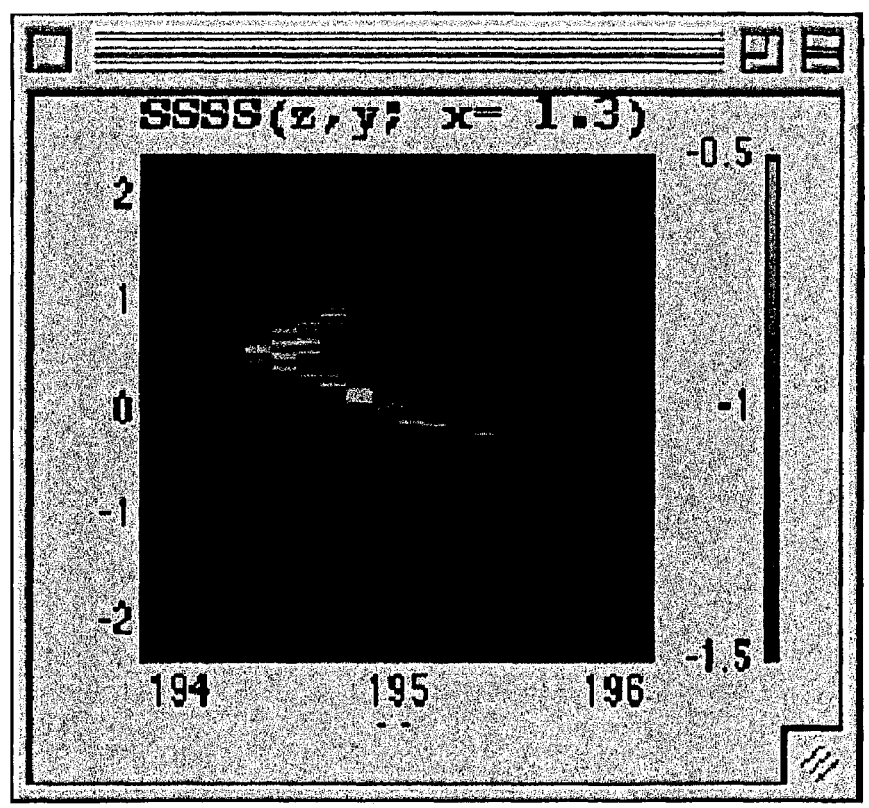
FIG. 9 is an animation of a z-y cross section of the three-dimensional reconstructed field at x=−1.3 mm, as 20 3D arrays are added in digital interference holography.

The effect of digital interference is illustrated in FIG. 9. The animation frames show a 2.35×4.8 mm z-y cross section at x=−1.3 mm, as the holographic field arrays are added on top of each other from 1 to 20. When N=1, the z variation is due to a small diffraction of the field, but at N=2 the field exhibits cosine variation in the z direction, with a different phase origin depending upon the object-to-surface distance. As further arrays are added, the cosine pattern becomes similar to $\partial$-function spikes in the z direction. When all 20 field arrays are accumulated, only one z value has a significant intensity above noise for each object surface pixel.

Figure 10A:
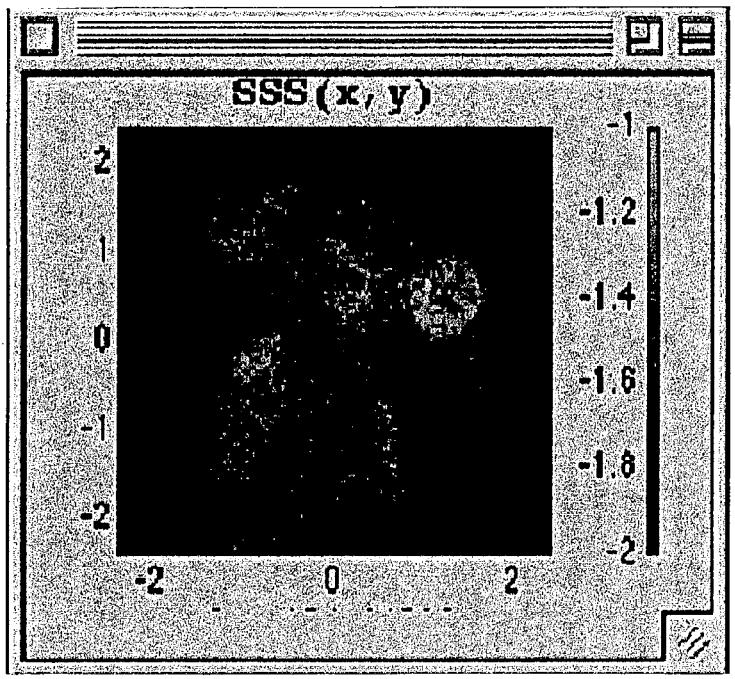
FIG. 10A are x-y cross sections of the accumulated array at various axial distances z.
Figure 10B:
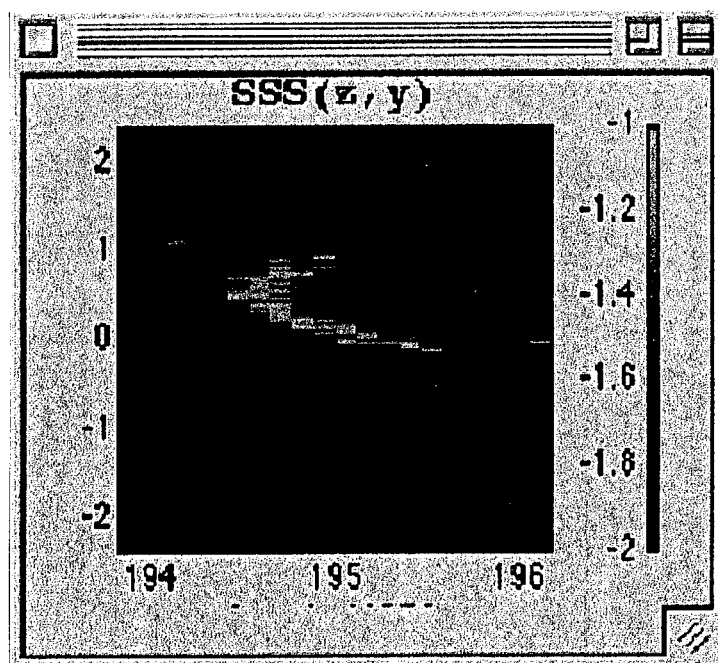
FIG. 10B are z-y cross sections of the accumulated array at various x values starting from the left end of the head, x=1.84 mm, to near the middle of the head, x=0.52 mm.

FIGS. 10A and 10B show cross-sectional tomographic views of the accumulated field array, with FIG. 10A showing x-y cross sections as the axial distance z is varied from the front tip of the mouthpiece to the back of the eyes, over a distance of 2.35 mm. FIG. 10B shows z-y cross sections as the x value is varied from 1.84 to 0.52 mm, or from the edge of the insect's left eye to the middle of the face.

The contrast of these images is numerically enhanced by taking the logarithm and applying thresholding to the calculated field arrays. Thus tomographic imaging by wavelength-scanning digital interference is clearly demonstrated. The accumulation of N holographic field arrays has an additional benefit of averaging out the coherent speckle noise.

Figure 7C:
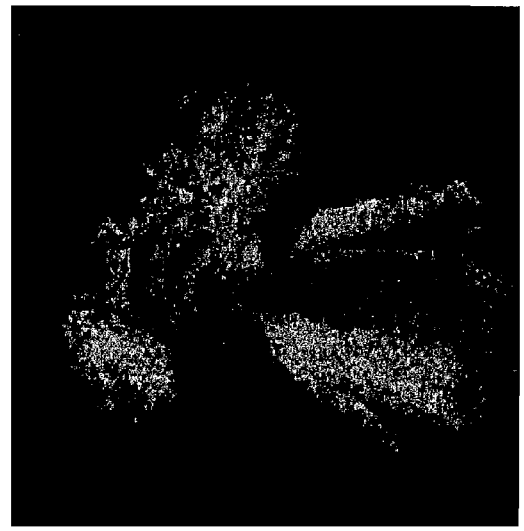
FIG. 7C is an image accumulated from 20 holograms.

FIG. 7C is obtained by starting from the accumulated array and summing over the z direction, yielding a 2D image of the object 80. The resulting image quality approaches that of the photographic image of FIG. 7A, and the speckle noise is substantially completely removed. Further, each object surface element is imaged in focus regardless of the depth of focus of the optical system. This feature is especially beneficial in an embodiment applied to microscopic imaging with a large numerical aperture.

Figure 11:
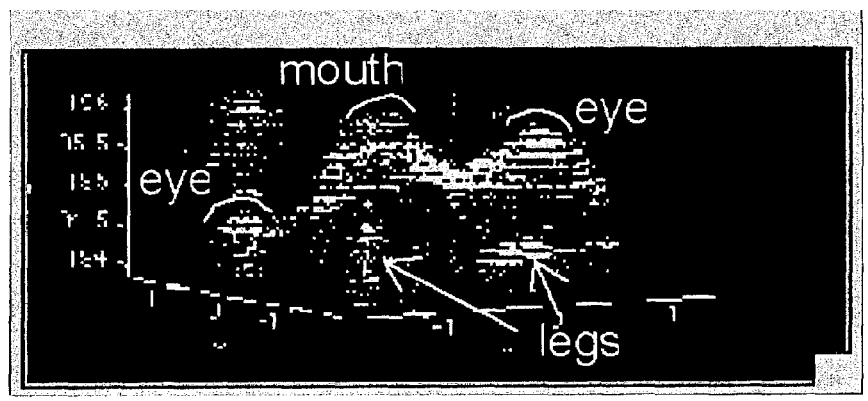
FIG. 11 is an animated three-dimensional reconstruction of the insect's illuminated surface.

An animated 3D reconstruction of the object's illuminated surface is made by plotting the brightest volume elements in 3D perspective (FIG. 11). As the azimuthal angle rotates, the two eyes and mouthpiece are recognizable as being the most prominent features. Two or three front legs are also visible, although there appear to be ghost images present.

This embodiment has demonstrated three-dimensional imaging of a small biological specimen using wavelength-scanning digital interference holography. Cross-sectional images of the object are generated with clear focus and suppression of coherent speckle noise. The resolutions achieved are ~100 μm in the axial direction and tens of micrometers in the lateral direction, as defined by the optical system and computer capacity of the present embodiment, and are thus not intended as limitations. With a semitransparent microscopic object, full tomographic imaging is possible.

REFERENCES

Brown, G. C., and R. J. Pryputniewicz, "Holographic Microscope for Measuring Displacements of Vibrating Microbeams Using Time-Averaged, Electro-Optic Holography," *Opt. Eng.* 37, 1398–405 (1998).

Cuche, E., F. Bevilacqua, and C. Depeursinge, "Digital Holography for Quantitative Phase-Contrast Imaging," *Opt. Lett.* 24, 291 (1999).

Goodman, J. W., *Introduction to Fourier Optics*, McGraw-Hill, New York (1968).

Hariharan, P., *Optical Holography*, Cambridge Univ. Press (1996).

Herman, B., and J. J. Lemasters, eds., *Optical Microscopy-Emerging Methods and Applications*, Academic Press (1993).

Huang, D., E. A. Swanson, C. P. Lin, et al., "Optical Coherence Tomography," *Science* 254, 1178–81 (1991).

Isenberg, G., ed., *Modern Optics, Electronics, and High Precision Techniques in Cell Biology*, Springer (1998).

Karnaukhov, V. N., N. S. Merzlyakov, M. G. Mozerov, L. I. Dimitrov, and E. Wenger, "Digital Display Holograms," *Optics and Lasers in Engineering* 29, 361–67 (1998).

Kim, M. K., "Wavelength-Scanning Digital Interference Holography for Optical Section Imaging," *Opt. Lett.* 24, 1693–95 (1999).

Kreis, T. M., M. Adams, and W. P. O. Jüptner, "Methods of Digital Holography: A Comparison," *Proc. SPIE* 3096 224–33 (1997).

Kreis, T. M., W. P. O. Jüptner, and J. Geldmacher, "Digital Holography: Methods and Applications," *Proc. SPIE* 3407, 169–77 (1998).

Le Clerc, F., and L. Collot, "Numerical Heterodyne Holography with Two-Dimensional Photodetector Arrays," *Opt. Lett.* 25, 716–18 (2000).

Morgner, U., W. Drexler, F. X. Kärtner, X. D. Li, C. Pitris, E. P. Ippen, and J. G. Fujimoto, "Spectroscopic Optical Coherence Tomography," *Opt. Lett.* 25, 111–13 (2000).

Piestun, R., J. Shamir, B. Wesskamp, and O. Brynagdahl, "On Axis Computer-Generated Holograms for Three-Dimensional Display," *Opt. Lett.*, 22, 922–24 (1997).

Poon, T. C., K. B. Doh, and B. W. Schilling, "Three-Dimensional Microscopy by Optical Scanning Holography," *Opt. Eng.* 34, 1338–44 (1995).

Robb, R. A., *Three-Dimensional Biomedical Imaging*, John Wiley & Sons (1997).

Schilling, B. W., T. C. Poon, G. Indebetouw, B. Storrie, K. Shinoda, Y. Suzuki, and M. H. Wu, "Three-Dimensional Holographic Fluorescence Microscopy," *Opt. Lett.* 22, 1506 (1997).

Schnars, U., and W. P. O. Jüptner, "Digital Holography—A New Method of Laser Metrology," *Laser and Optoelektronik* 26, 40–45 (1994) (in German).

Schnars, U., M. Thomas, and W. P. Jüptner, "Digital Recording and Numerical Reconstruction of Holograms: Reduction of the Spatial Frequency Spectrum," *Opt. Engg.* 35, 977–82 (1996).

Sheppard, C. J. R., and D. M. Shotton, *Confocal Laser Scanning Microscopy*, Springer(1997).

Seebacher, S., W. Osten, and W. Jüptner, "Measuring Shape and Deformation of Small Objects Using Digital Holography," *Proc. SPIE*, 3479, 104–15 (1998).

Trester, S., "Computer Simulated Holography and Computer Generated Holograms," *Am. J. Physics* 64, 472–78 (1996).

Vikram, C. S., *Particle Field Holography*, Cambridge Univ. Press (1992).

Yang, H., K. T. Kim, J. H. Kim, and E. S. Kim, "3D Digital Hologram Synthesis Based on Angular Spectrum," *Proc. SPIE* 3389, 169–78 (1998a).

Yang, H. G., C. Y. Ryu, and E. S. Kim, "Hologram Segmentation for Relaxing Sampling Constraint in Digital Hologram," *J. Korea Inst. Electronics Engineers* 35D, 76–81 (1998b) (in Korean).

Yaraslavskii, L. P., and N. S. Merzlyakov, *Methods of Digital Holography*, Consultants Bureau (1980).

Yarosklavky, L., and M. Eden, *Fundamentals of Digital Optics*, Birkhäuser (1996).

Zhang, T., and I. Yamaguchi, "Three-Dimensional Microscopy with Phase Shifting Digital Holography," *Proc. SPIE* 3479, 152–59 (1998a).

Zhang, T., and I. Yamaguchi, *Opt. Lett.* 23, 1221 (1998b).

What is claimed is:

1. A method for imaging a three-dimensional object comprising the steps of:
   (a) illuminating an object with radiation at a wavelength to form a reflected image beam;
   (b) providing a reference beam comprising the wavelength;
   (c) recording an interference pattern between the reference beam and the image beam;
   repeating steps (a)–(c) at a succession of different wavelengths separated by a predetermined wavelength step;
   computing a holographic image from the interference pattern for each wavelength;
   adding the holographic images together to form an intensity distribution pattern;
   extracting out a series of two-dimensional cross-sectional images from the intensity distribution pattern;
   correcting microscopic image distortion in the cross-sectional images; and
   reassembling the cross-sectional images into a three-dimensional model of the object.

2. The method recited in claim 1, wherein the illuminating step comprises illuminating the object with coherent radiation.

3. The method recited in claim 2, further comprising the step of expanding the coherent radiation prior to the illuminating step.

4. The method recited in claim 1, wherein the predetermined wavelength step comprises a function of an axial scale of the object.

5. The method recited in claim 1, further comprising the step of subtracting a zero-order intensity from each computed holographic image prior to the adding step.

6. A method for imaging a three-dimensional object comprising the steps of:
   (a) illuminating an object with radiation at a wavelength to form a reflected image beam;
   (b) providing a reference beam comprising the wavelength;
   (c) recording an interference pattern between the reference beam and the image beam;
   (d) recording an image of the object only; and
   (e) recording an image of the reference beam only;
   repeating steps (a)–(e) at a succession of different wavelengths separated by a predetermined wavelength step;
   computing a holographic image from the interference pattern for each wavelength;
   subtracting a zero-order intensity from each computed holographic image, wherein the subtracting step comprises subtracting the object-only and reference-beam-only images from the interference pattern; and
   adding the holographic images together to form an intensity distribution pattern.

7. The method recited in claim 6, wherein the computing step comprises calculating a holographic image field at each wavelength using a Fresnel diffraction formula.

8. A method for imaging a three-dimensional object comprising the steps of:
   (a) illuminating an object with radiation at a wavelength to form a reflected image beam;
   (b) providing a reference beam comprising the wavelength;
   (c) recording an interference pattern between the reference beam and the image beam;
   repeating steps (a)–(c) at a succession of different wavelengths separated by a predetermined wavelength step;
   computing a holographic image from the interference pattern for each wavelength; and
   adding the holographic images together to form an intensity distribution pattern, wherein the object comprises two two-dimensional objects positioned different distances from a source of the radiation, and further comprising the step of extracting out two two-dimensional cross-sectional images from the intensity distribution pattern, each image representative of one of the objects.

9. The method recited in claim 8, wherein the extracting step comprises encoding the Fresnel diffraction as a function of a Fourier transform with respect to radiation wavelength.

* * * * *